(12) United States Patent
Shqau et al.

(10) Patent No.: US 8,177,890 B2
(45) Date of Patent: May 15, 2012

(54) STABLE SUPPORTED PD-ALLOY MEMBRANES

(75) Inventors: Krenar Shqau, Columbus, OH (US); Hendrik Verweij, Upper Arlington, OH (US)

(73) Assignee: The Ohio State University, Columbus, OH (US)

( * ) Notice: Subject to any disclaimer, the term of this patent is extended or adjusted under 35 U.S.C. 154(b) by 438 days.

(21) Appl. No.: 12/492,225

(22) Filed: Jun. 26, 2009

(65) Prior Publication Data

US 2010/0071556 A1 Mar. 25, 2010

Related U.S. Application Data

(60) Provisional application No. 61/076,737, filed on Jun. 30, 2008.

(51) Int. Cl.
*B01D 53/22* (2006.01)
(52) U.S. Cl. .................. 96/11; 95/45; 95/51; 96/4; 96/7
(58) Field of Classification Search ................ 95/45, 51; 96/4, 7, 11
See application file for complete search history.

(56) References Cited

U.S. PATENT DOCUMENTS

| | | | | |
|---|---|---|---|---|
| 4,770,479 A * | 9/1988 | Tustison | ........................ | 359/360 |
| 5,280,373 A * | 1/1994 | Ozawa et al. | .................... | 349/86 |
| 5,597,771 A * | 1/1997 | Hu et al. | ........................ | 502/304 |
| 5,616,223 A * | 4/1997 | Shen et al. | ..................... | 204/295 |
| 5,738,708 A * | 4/1998 | Peachey et al. | ..................... | 95/56 |
| 6,048,472 A * | 4/2000 | Nataraj et al. | ................ | 252/373 |
| 6,087,298 A * | 7/2000 | Sung et al. | ..................... | 502/333 |
| 6,187,157 B1 * | 2/2001 | Chen et al. | ..................... | 204/296 |
| 6,569,226 B1 * | 5/2003 | Dorris et al. | ........................ | 95/56 |
| 7,959,711 B2 * | 6/2011 | Saukaitis et al. | .................. | 95/55 |
| 2003/0100447 A1 * | 5/2003 | Deeba et al. | .................. | 502/339 |

OTHER PUBLICATIONS

Chen et al. Microstructural Development, Electrical Properties and Oxygen Permeation of Zirconia-Palladium Composites, Solid State Ionics 76: 23-28 (1995).*

* cited by examiner

*Primary Examiner* — Jason M Greene
*Assistant Examiner* — Anthony Shumate
(74) *Attorney, Agent, or Firm* — Dinsmore & Shohl LLP

(57) ABSTRACT

A Pd alloy membrane and method of making are described.

11 Claims, 6 Drawing Sheets

STABLE SUPPORTED PD-ALLOY MEMBRANES

This application claims the benefit of U.S. Provisional Application Ser. No. 61/076,737, filed Jun. 30, 2008.

FIELD OF THE INVENTION

The present invention relates generally to Pd-alloy membranes, and more particularly to thin, pinhole-free Pd-alloy membranes which are cost effective.

BACKGROUND

Supported Pd-alloy membranes are used for the separation of hydrogen ($H_2$) from gas mixtures. The dense Pd-alloy (PdA) structure only allows the $H_2$ to pass in the form of interstitial H atoms. As a result, it blocks all other gases. PdA membranes generally operate at temperatures above 300° C. Pd is the major constituent. The Pd is typically alloyed with other metals, including, but not limited to, Cu, Ag, and Au. Alloying Pd with other metals has several purposes. First, alloying helps to suppress a destructive α-β phase transformation. In addition, it makes the membranes more stable against contaminants in practical processing atmospheres.

$H_2$ separation with PdA membranes has the ability to produce very pure $H_2$ for use in Polymer Electrolyte Membrane (PEM, also called Proton Exchange Membrane) fuel cells. $H_2$ produced using PdA membranes should contain less than 20 ppm CO. PdA membranes could be used in membrane reactors with $H_2$ semi-permeable walls. Selective removal of $H_2$ in reforming or coal gasification mixtures could result in significant conversion enhancement and greatly improved space yield.

Consequently, PdA membranes are being considered for use in new coal-fired power plants. State of the art PdA membranes are made as either stand-alone thin-walled tubes, or supported on a multi-layer porous carrier structure. The thin walled tubes have a thickness of about 20 μm, while the supported PdA membranes have a thickness of about 3 μm or more. The supported PdA membrane concept is preferred for reasons of cost-price, $H_2$ production performance, and mechanical stability and strength.

Currently, development is being done with a) unsupported PdA tubes more than 10 μm thick, b) with stainless steel carriers provided with a Tosoh zirconia layer, and about 3 μm or more thick PdA by electroless deposition, and c) with stainless steel carriers with very high surface roughness provided with a ceramic buffer layer by oxidation and more than 3 μm thick PdA by electro-deposition technique.

The use of state of the art supported PdA membranes involves major challenges. One problem is developing a PdA membrane that is sufficiently thin, preferably less than 1 μm, and which is free of pinholes, which has sufficient adhesion to the support layer, and which is stable at the operating conditions. Another problem is developing a supported PdA membrane structure with a membrane module area/volume greater than 100 m$^{-1}$, and with a cost/price of less than \$500/m$^2$.

Part of the technical problems with the state of the art PdA membranes relates to the generally inferior homogeneity of the supporting structure which results in an irregular deposition surface, poor adhesion, and instability during the lifetime of the membrane. The cost/price of the state of the art supported membranes does not depend as much on the PdA raw material price, as on the cost/price of the supporting structure, the manufacturing time and temperature of the supporting structure, and the currently inferior reproducibility and stability of supported membrane structures.

Therefore, there is a need for a thin, pinhole-free PdA membrane which is cost effective.

DESCRIPTION OF THE INVENTION

Figure 1:
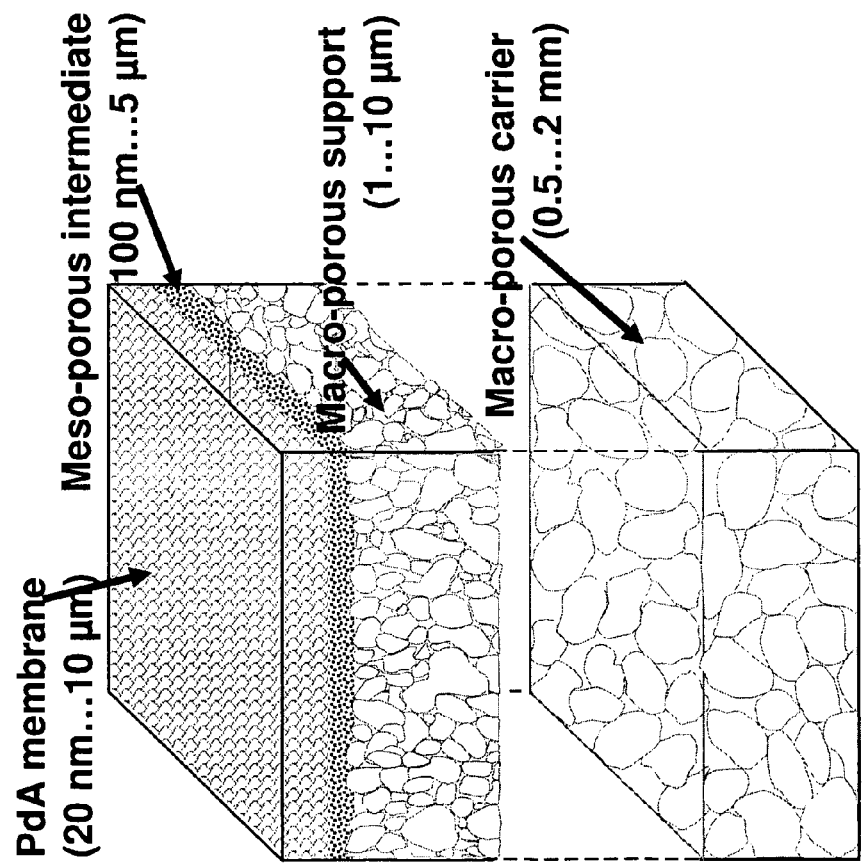
FIG. 1 is a schematic of a supported PdA membrane structure.

The present invention meets this need by providing a supported PdA membrane structure. By "PdA" or "Pd alloy," we mean both pure Pd and Pd alloys. The membrane-supporting structure can be a flat plate, a tube, or a multi-channel structure. For the membrane reactor application, the tubular geometry is preferred, but the invention disclosed here is not limited to that geometry. The supporting structure is built up in one or more layers, generally consisting of a thick, coarse porous carrier structure, provided with one or more intermediate layers as shown in FIG. 1. FIG. 1 shows a schematic of a supported PdA membrane structure. It includes a macroporous ($\emptyset_p$>50 nm) carrier of about 0.5-2 mm, a macroporous support layer of about 1-10 μm, a meso-porous (2 nm<$\emptyset_p$<50 nm) intermediate of about 100 nm to about 5 μm, and the PdA membrane of about 20 nm to about 10 μm. In an optimized design, the layer thickness, X, is roughly proportional to $\emptyset_p$ (characteristic pore diameter).

The function of the carrier is to provide strength to the thin membrane. However, its pore size, $\emptyset_p$, and porosity, $\emptyset_p$ (volume fraction of total porosity), should be should such that it is sufficiently permeable for the $H_2$. The function of the intermediate layers is to bridge the coarse porosity of the support so that a fine porous deposition surface is obtained that allows for a homogeneous thin PdA membrane.

Figure 2:
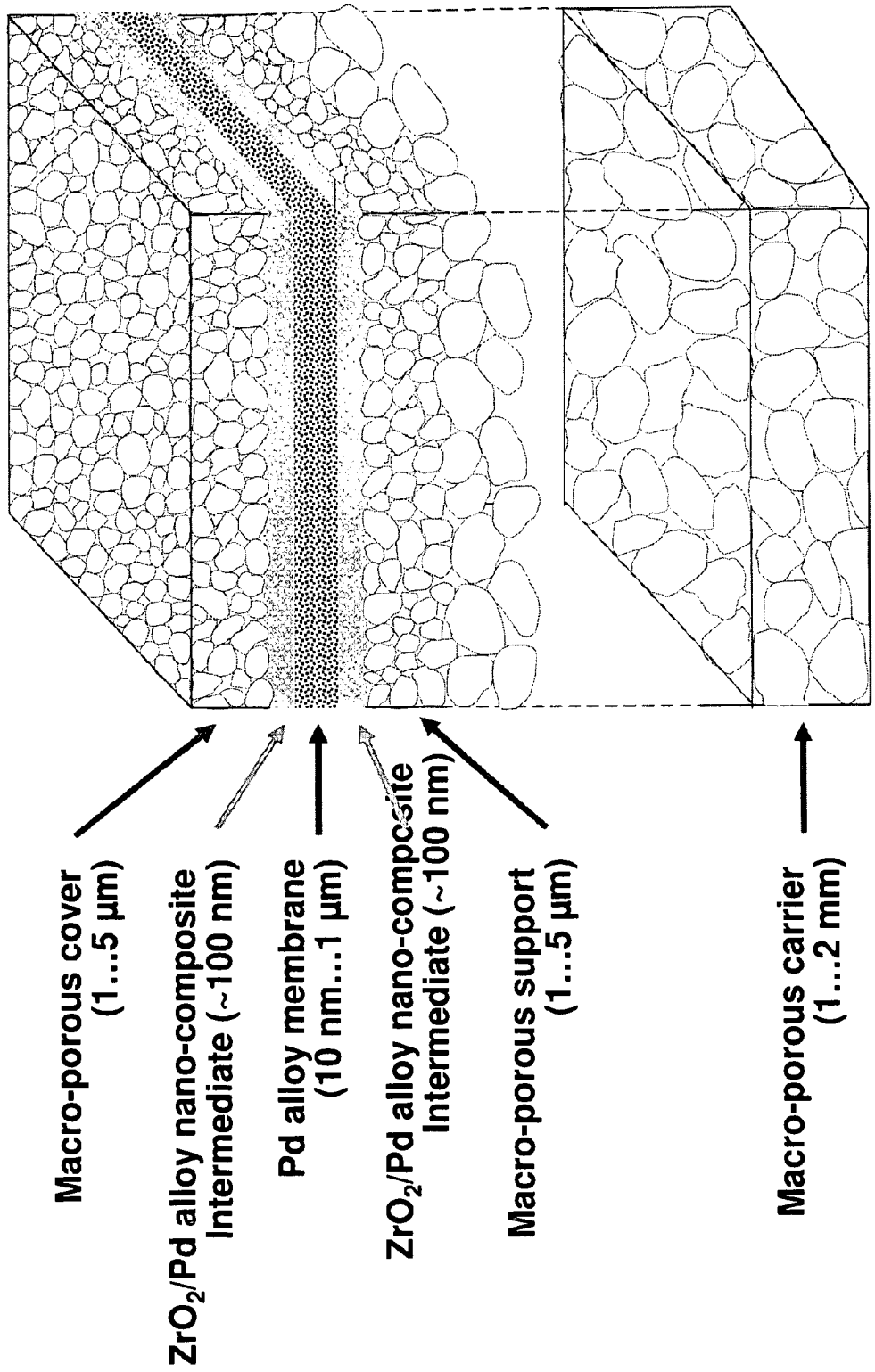
FIG. 2 is a schematic of a preferred design of a supported PdA structure according to the present invention.

One preferred design of a supported PdA membrane structure with nano-composite nucleation/coupling layers and macro-porous protection layer is shown in FIG. 2. There is a macro-porous carrier of about 1-2 mm, a macroporous support layer of about 1-5 μm, a $ZrO_2$/PdA porous nano-composite intermediate of about 100 nm, a Pd alloy membrane of about 10 nm to about 1 μm, a $ZrO_2$/PdA nano-composite intermediate of about 100 nm, and a macro-porous cover layer of about 1-5 μm. The macro-porous support layer is typically made of α-$Al_2O_3$ or $Zro_2$-based compositions. The macro-porous carrier is generally made of the same compositions or of stainless steel.

Figure 3:
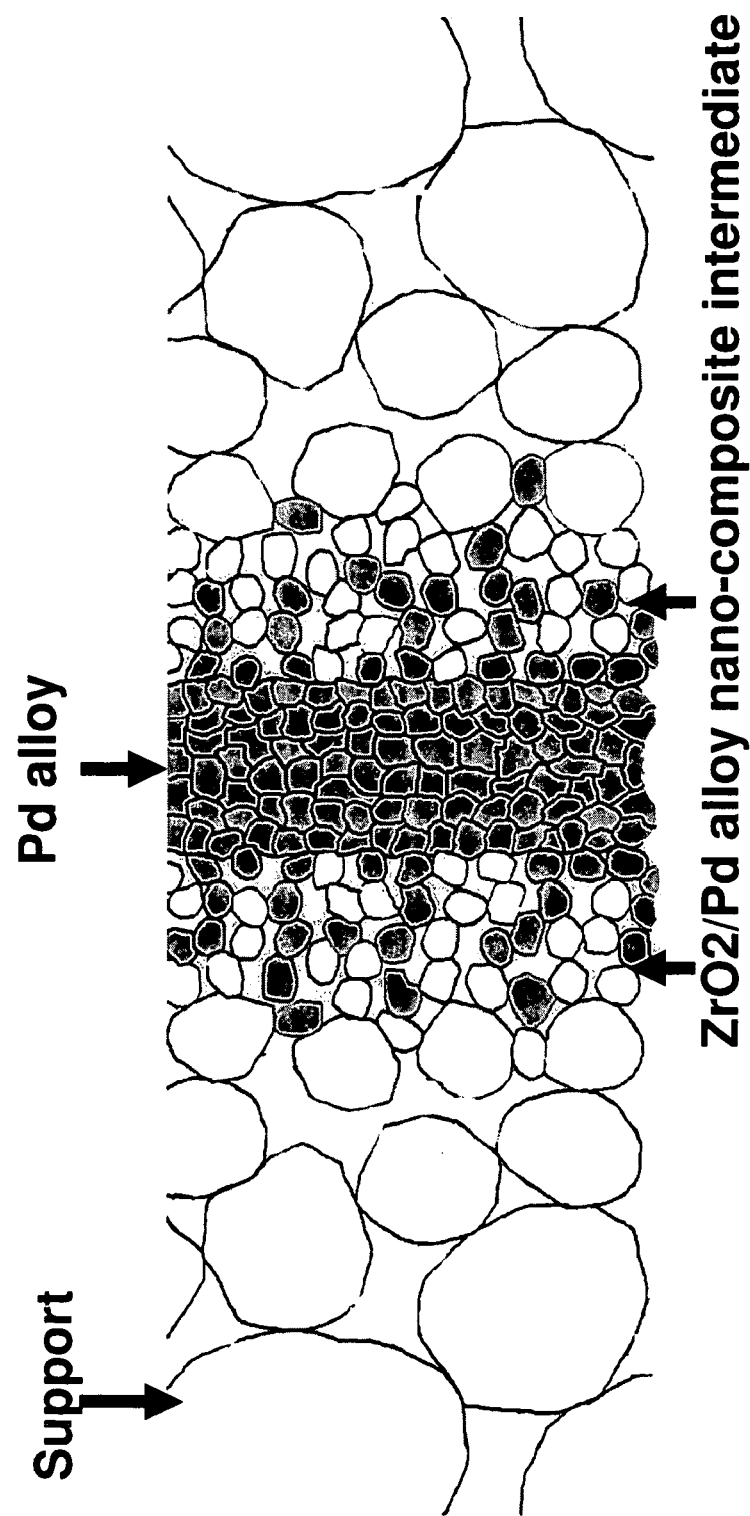
FIG. 3 is a schematic of the connection between the PdA membrane and the support layer.

A schematic of the detailed connection of the functional PdA membrane and the support layer is shown in FIG. 3. There is no chemical adhesion between the PdA phase and the oxide. However, the $ZrO_2$ (yellow) does have a chemical adhesion with the support layer. The tortuous nature of the PdA and ZrO$_2$ causes good adhesion between the continuous PdA membrane and the support.

Our invention addresses both of the challenges of the state of the art PdA membranes. It includes a nano-composite PdA/oxide intermediate layer that provides a very efficient nucleation of PdA by electroless deposition, thus reducing the deposition time to less than 10 minutes for a homogeneous deposition of a 10-1000 nm thick PdA membrane. In addition, due to hydrogen permeable metallic particles (Pd and/or PdA) being uniformly dispersed on a ceramic matrix (such as zirconia), no deterioration caused by α-β transformation has been observed. The ability to make much thinner membranes leads to a much reduced transport resistance for H$_2$ permeation, a much improved thermo-chemical stability since thermal expansion mismatches are no longer important, and the possibility of using chemically more stable but less permeable PdA compositions.

The nano-composite PdA/oxide intermediate layer also provides a self-aligned repair (plugging) of any defects in the deposition surface. It involves a very good adhesion, as shown in the sandwich structure of FIG. 3. Finally, it involves the related capability to provide the PdA membrane with a well-connected macro-porous top-layer. This top layer stabilizes the PdA layer against destructive surface-tension-induced rearrangement, destructive (localized) corrosion by gaseous contaminants, and abrasive action of particulate contamination and heterogeneous catalysts in practical reactor atmospheres.

Synthesis of Supported Membrane Structures

All carrier, support, and intermediate layers of the prototype presented in the next section were made by colloidal compaction of well-dispersed particles of similar size, followed by thermal processing.

The colloidal stabilization of the particles was adjusted to obtain dense-packed and, hence, homogeneous layers. The carrier and support particles were obtained from a commercial source: AA3 and AKP30 α-Al$_2$O$_3$ from Sumitomo Chemical, with a typical particle size of 3 μm and 300 nm, respectively. These particles were dispersed by means of ultrasonic agitation in water in the presence of a colloidal stabilizer and a polymeric binder. (M. L. Mottern, Z. Warchol, W. Chiu, K. Shqau, H. Verweij, "High-performance membrane supports: A colloidal approach to the consolidation of coarse particles," *International Journal of Hydrogen Energy*, (2008) accepted). The thus obtained dispersion was screened on a nylon sieve to remove residual agglomerates and other particulate contamination. The AA3 particles were compacted to a 2 mm thick layer by colloidal filtration, followed by sintering at 1300° C. The AKP30 dispersion was dip-coated on a AA3 carrier, followed by sintering at 950° C. to form a 5-10 μm thick support layer. A dispersion of γ-alumina precursor particles of about 10 nm Ø was prepared by hydrolysis of aluminum-tri-sec-butoxide (ATSB), followed by peptization in hot aqueous HNO$_3$ and purification by centrifugation (T. Kuzniatsova, M. L. Mortem, K. Shqau, D. Yu, H. Verweij, "Microstructural optimization of supported 'γ-Alumina membranes," *Journal of Membrane Science*, 316 [1] 80-88 (2008)). The γ-alumina precursor particles were dip coated on the AKP3O support, followed by calcination at 600° C. to form a 500 nm to 1 μm thick intermediate layer. (T. Kuzniatsova, M. L. Mortem, K. Shqau, D. Yu, H. Verweij, "Microstructural optimization of supported 'γ-Alumina membranes," *Journal of Membrane Science*, 316[1] 80-88 (2008)).

Figure 4:
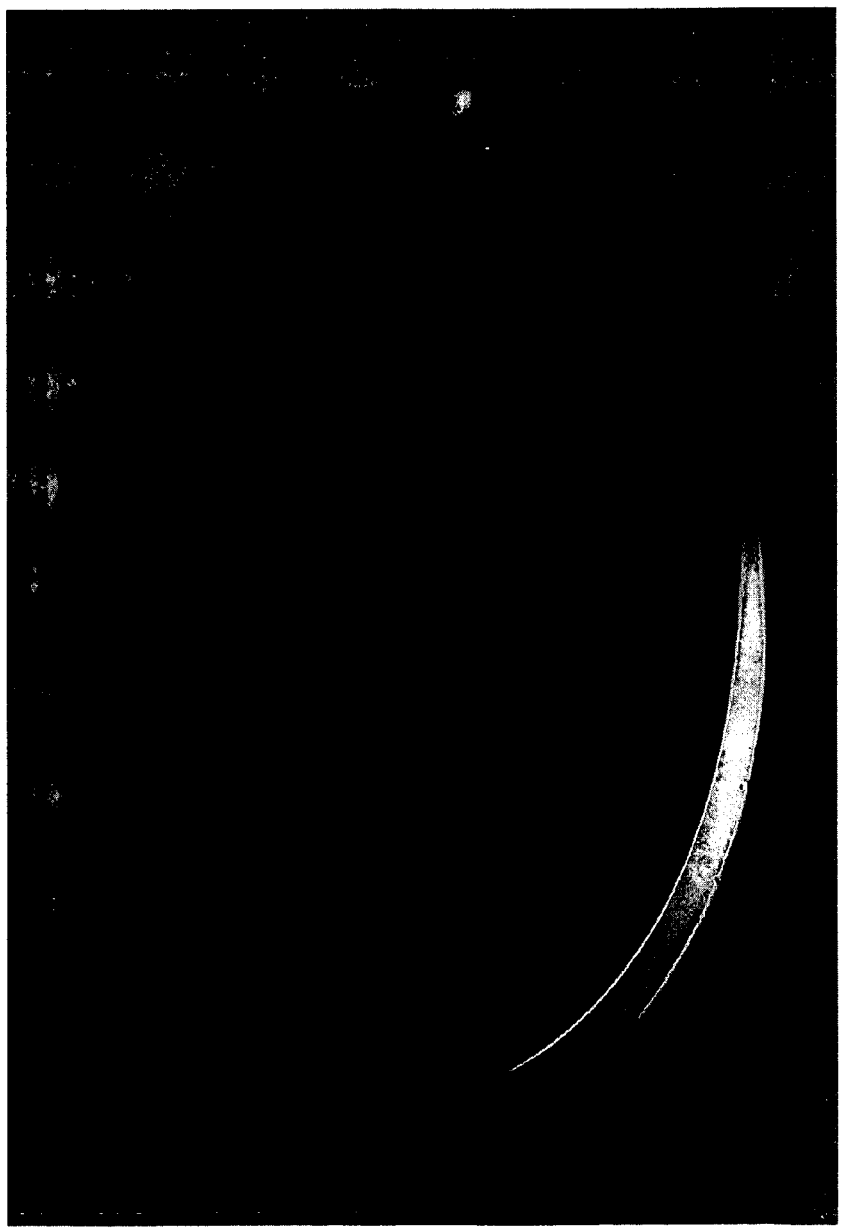
FIG. 4 is a photograph of a Pd membrane on a flat supporting structure.

A 70/30 vol % Pd/oxide precursor dispersion was prepared by MetaMateria Partners LLC (MMP) by means of sonochemical precipitation in the presence of a steric stabilizer. This dispersion was dip-coated on the γ-alumina intermediate, followed by calcination/reduction at 450° C. in forming gas to form an about 100 nm thick meso-porous layer. This was followed by electroless deposition of a 200 nm Pd film by state of the art techniques, and annealing at 500° C. under reducing atmosphere. One of the first membranes on a flat supporting structure is shown in FIG. 4. The Pd membrane of FIG. 4 is about 200 nm thick on a 43 mm Ø flat supporting structure as described.

The compositions for the carrier, support, and intermediate layers are not limited to alumina. In particular, for the carrier structure, stainless steel may be preferred material. The support layer may also be made of stabilized zirconia, while the γ-alumina layer is preferably left out in future structures. In addition, the oxide in the PdA/oxide composite layer can have any stable and compatible composition.

Figure 5:
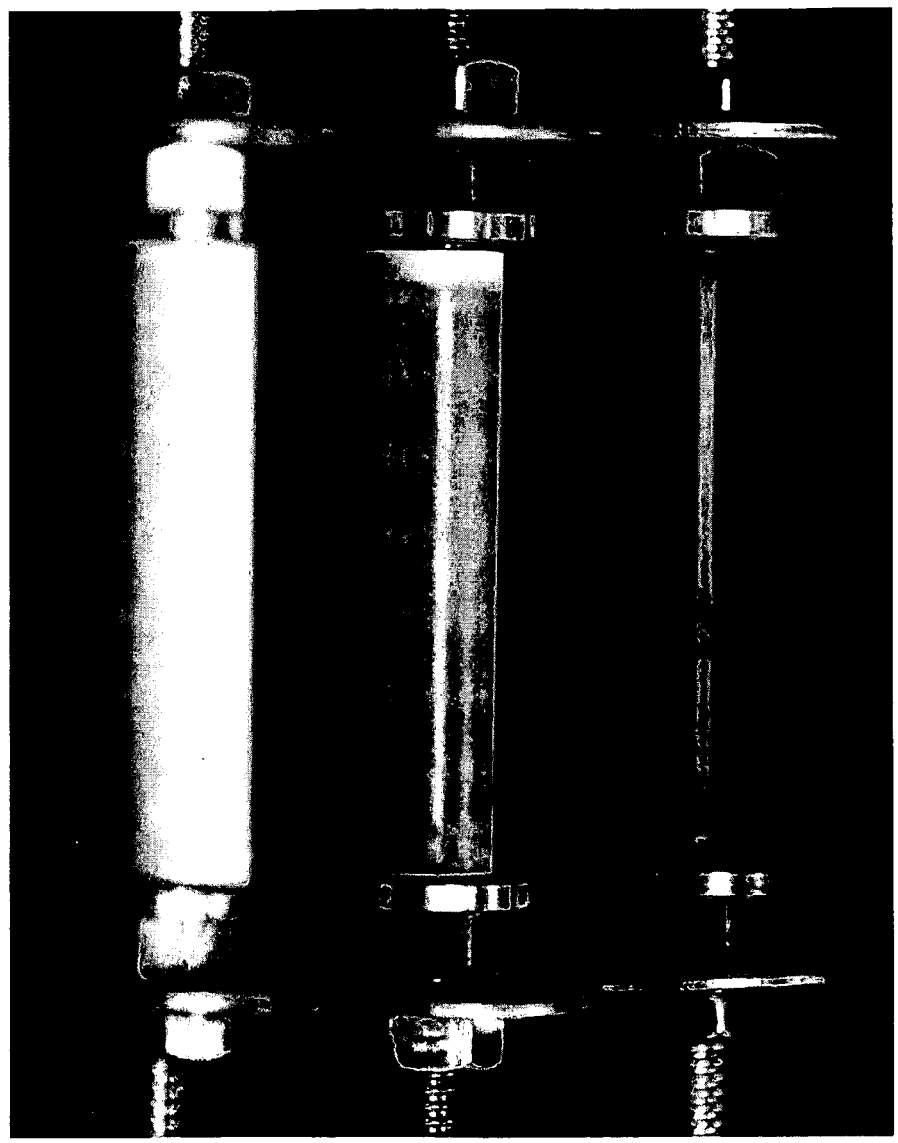
FIG. 5 is a photograph of porous α-$Al_2O_3$ carrier tubes with an AKP30 support layer: upper tube—γ-alumina intermediate layer; middle tube—unreduced composite layer; lower tube—reduced Pd layer.

The consolidation techniques are not limited colloidal compaction. Other forming techniques may be chosen for the carrier as a compromise between surface quality and economics. Examples include extrusion of tubes and honeycombs, and gel-casting. Gel-casting has been used to create the first tubular supported PdA membranes with the deposition technique presented here, as shown in FIG. 5. FIG. 5 shows porous α-Al$_2$O$_3$ carrier tubes, with AKP30 support layer: upper tube—γ-alumina intermediate layer; middle tube—unreduced composite layer; lower tube—reduced Pd layer.

Performance of the First Membranes

Figure 6:
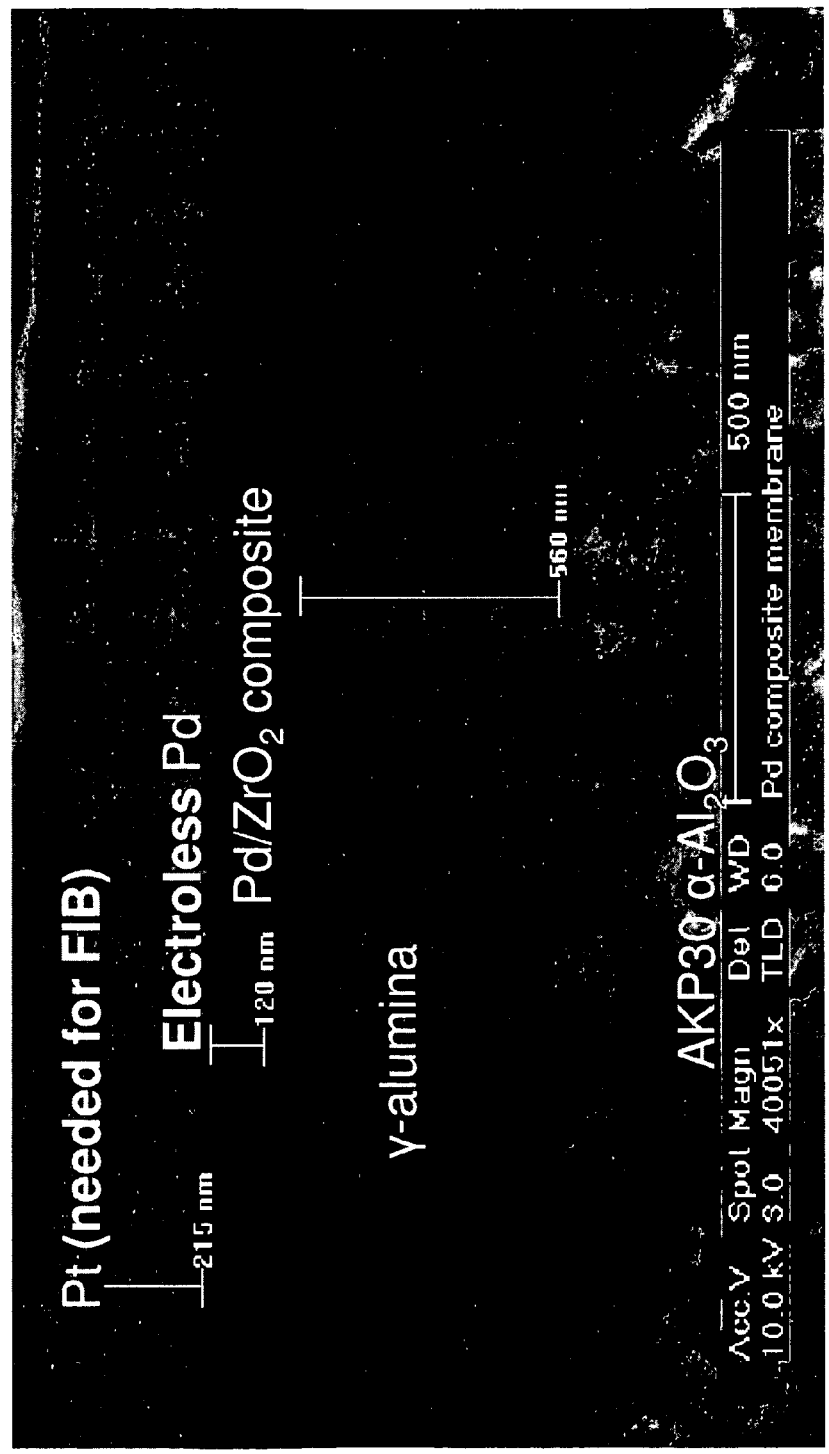
FIG. 6 is a Transmission Electron Micrograph (TEM) of a Focused Ion Beam cross-section of a Pd membrane as shown in FIG. 4.

The first Pd membranes, made on flat supporting structures as described were characterized by transmission electron microscopy (TEM) studies of Focused Ion Beam (FIB) cross-sections as shown in FIG. 6. Both the flat and tubular membranes were N$_2$ dense at room temperature. H$_2$ fluxes were determined to be 0.25 mol/(m$^2$s) at 320° C., 0.1 mol/(m$^2$s) at 260° C., and 0.04 mol/(m$^2$s) at 200° C., with a H$_2$ feed pressure of 2 Bar and vacuum at the permeate side.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A Pd alloy membrane comprising:
   a ZrO$_2$/Pd alloy nano-composite intermediate layer; and
   a Pd alloy membrane layer on the ZrO$_2$/Pd alloy nano-composite intermediate layer.

2. The Pd alloy membrane of claim 1 wherein the ZrO$_2$/Pd alloy nano-composite intermediate layer is about 100 nm thick.

3. The Pd alloy membrane of claim 1 wherein the Pd alloy membrane layer has a thickness in a range of between about 10 nm and about 1 μm.

4. The Pd alloy membrane of claim 1 further comprising a macro-porous carrier and a macro-porous support layer on the macro-porous carrier, wherein the ZrO$_2$/Pd alloy nano-composite intermediate layer is on the macro-porous support layer.

5. The Pd alloy membrane of claim 4 wherein the macro-porous carrier has a thickness in a range of between about 1 mm and about 2 mm.

6. The Pd alloy membrane of claim 4 wherein the macro-porous support layer has a thickness in a range of between about 1 μm and about 5 μm.

7. The Pd alloy membrane of claim 1 further comprising a second $ZrO_2$/Pd alloy nano-composite intermediate layer on the Pd alloy membrane layer.

8. The Pd alloy membrane of claim 7 wherein the second $ZrO_2$/Pd alloy nano-composite intermediate layer is about 100 nm thick.

9. The Pd alloy membrane of claim 7 further comprising a macro-porous cover on the second $ZrO_2$/Pd alloy nano-composite intermediate layer.

10. The Pd alloy membrane of claim 9 wherein the macro-porous cover has a thickness in a range of between about 1 μm and about 5 μm.

11. A Pd alloy membrane comprising:
a macro-porous carrier;
a macro-porous support layer on the macro-porous carrier;
a $ZrO_2$/Pd alloy nano-composite intermediate layer on the macro-porous support layer;
a Pd alloy membrane layer on the $ZrO_2$/Pd alloy nano-composite intermediate layer
a second $ZrO_2$/Pd alloy nano-composite intermediate layer on the Pd alloy membrane layer; and
a macro-porous cover on the second $ZrO_2$/Pd alloy nano-composite intermediate layer.

\* \* \* \* \*